United States Patent [19]

Bergmann et al.

[11] Patent Number: 5,536,842

[45] Date of Patent: Jul. 16, 1996

[54] PURIFICATION OF INDIGO

[75] Inventors: Udo Bergmann, Bensheim; Manfred Gäng, Bobenheim-Roxheim; Reinhold Kohlhaupt, Frankenthal, all of Germany

[73] Assignee: BASF Aktiengesellschaft, Ludwigshafen, Germany

[21] Appl. No.: 326,851

[22] Filed: Oct. 21, 1994

[30] Foreign Application Priority Data

Oct. 22, 1993 [DE] Germany .......................... 43 36 032.7

[51] Int. Cl.[6] ................................................. C07D 403/04
[52] U.S. Cl. ............................................. 548/457; 548/458
[58] Field of Search ...................................... 548/457, 458

[56] References Cited

U.S. PATENT DOCUMENTS 5,075,458   12/1991   Kohlhaupt et al. ................... 548/457
5,109,137    4/1992   Kohlhaupt et al. ................... 548/457
5,116,996    5/1992   Kohlhaupt et al. ................... 548/457
5,116,997    5/1992   Kohlhaupt ............................. 548/457

FOREIGN PATENT DOCUMENTS

0509275A1   10/1992   European Pat. Off. .
0509274A1   10/1992   European Pat. Off. .
0523532A2    1/1993   European Pat. Off. .
0575925A1   12/1993   European Pat. Off. .

*Primary Examiner*—Mukund J. Shah
*Assistant Examiner*—Anthony P. Bottino
*Attorney, Agent, or Firm*—Oblon, Spivak, McClelland, Maier, & Neustadt

[57] ABSTRACT

A process for purifying indigo comprises extracting an aqueous leuco indigo alkali metal salt solution with an inert solvent under oxygen-excluding conditions and conventionally regenerating the indigo by oxidation.

6 Claims, No Drawings

PURIFICATION OF INDIGO

Indigo, by volume the world's largest synthetic textile dye, is despite sophisticated production processes impure in the as-produced state, containing for example up to 0.6% by weight of aniline and 0.4% by weight of N-methylaniline. Even smaller amounts are present of other compounds which ideally should be removed.

The patent literature already discloses some processes for purifying indigo.

For instance, EP-A-509 275 concerns a process for preparing purified indigo by extracting the as-synthesized aqueous alkaline indoxylate solution, before its oxidation to indigo, with inert water insoluble solvent under oxygen-excluding conditions.

EP-A-509 274 concerns a process for purifying indigo by converting the indigo with sulfuric acid into indigo sulfate, separating it off and then hydrolyzing it to re-form the indigo, and then treating it with dilute hydrogen peroxide solution.

EP-A-523 532 discloses a process for purifying indigo wherein the as-synthesized aqueous alkaline indoxylate solution, before its oxidation to indigo, is stripped of impurities under oxygen-excluding conditions by distillation or by introduction of steam or an inert gas and the indigo subsequently obtained by oxidation of the stripped indoxylate solution is treated with dilute hydrogen peroxide solution.

Finally, EP Application 93 109 841.2 discloses a process for purifying indigo by heating the indigo in an inert organic solvent at from 150° to 250° C., preferably at from 180° to 220° C.

It has now been found that very substantially purified indigo is obtained in good yield when the as-synthesized dye is initially dissolved in water in a known manner by reduction in the form of the alkali metal salt of its leuco compound, then the resulting aqueous solution is extracted under oxygen-excluding conditions with a water-insoluble inert organic solvent, and, after phase separation, the extracted solution of the leuco indigo salt is oxidized to indigo in a known manner.

To ensure quantitative removal of the extractable impurities from the solution of the leuco indigo salt, it is important to carry out the extraction with the organic solvent under strict oxygen exclusion, which is advantageously achieved by working under nitrogen.

This is because even minuscule amounts of oxygen react with the dissolved salt of the leuco indigo to form indigo, which then irreversibly re-occludes aniline and N-methylaniline and other unwelcome impurities.

Maximum extraction of the impurities present in the solution of the leuco indigo salt is ensured, for example in the case of a solution of from 5 to 25% by weight of indigo in the form of the salt of its leuco compound, by using a weight ratio (phase ratio) of leuco indigo salt:organic solvent of from 1:0.1 to 1:10, preferably from 1:0.5 to 1:5.

In an advantageous embodiment of the process according to the invention, the aqueous alkaline leuco indigo solution obtained following indigo reduction with an indigo content of from 5 to 25% by weight is extracted at from 25° to 100° C., preferably at from 40° to 70° C., with an inert organic solvent in a phase ratio of from 1:1 to 1:3 for from 10 to 30 minutes under nitrogen. After phase separation, the extracted solution of the leuco indigo salt is oxidized with air in a conventional manner to obtain indigo having a very high purity of from 98 to >99.5% (measured photometrically).

The dye is generally free of aniline and N-methylaniline; other unwelcome impurities are likewise quantitatively removed by the extraction.

The solvent employed for the extraction, which contains the extractable impurities, is redistilled and then re-used as extractant.

The process can be carried out batchwise or continuously.

Examples of suitable solvents include all essentially water-insoluble solvents which are inert under the reaction conditions, such as hydrocarbons, halohydrocarbons, ethers or else alcohols or mixtures thereof.

Specific examples of suitable solvents are chloroform, dichloroethylene, perchloroethylene, dichlorofluoroethylene, chlorobenzene, methyl isopropyl ether, methyl isobutyl ether, di-n-butyl ether, diisoamyl ether, n-hexanol, n-octanol, 2-ethylhexanol, n-nonanol, n-decanol, isononanol (isomer mixture), isodecanol (isomer mixture), hexane, cyclohexane, octane, decane, petroleum ether of suitable boiling range, toluene, xylene, diethyl ketone, methyl isobutyl ketone, di-n-butyl ketone or cyclohexanone and also mixtures thereof.

Preferred solvents are in particular xylenes, toluene and 2-ethylhexanol.

The aqueous salt solutions of leuco indigo used for the extraction are produced in a conventional manner by reduction of indigo using as reducing agents for example hydrogen/Raney nickel, sodium dithionite ($Na_2S_2O_4$) or hydroxyacetone.

EXAMPLE 1

200 parts of a solution of leuco indigo sodium salt prepared in a conventional manner by catalytic hydrogenation of 40 parts of indigo and 600 parts of toluene are heated under nitrogen in a stirred 2 l flask to 65° C. and vigorously stirred at that temperature for 15 minutes at a stirrer speed of 500 rpm while the nitrogen atmosphere is maintained. The toluene phase is separated off, and the extracted solution of leuco indigo sodium salt is converted into indigo in a conventional manner at 65°–85° C. by passing air into the solution. The dye is filtered off, washed neutral and dried.

The indigo obtained has a purity of 98–99% (measured photometrically) and is free of aniline, N-methylaniline and other unwelcome impurities.

EXAMPLE 2

Example 1 is repeated on 600 parts of a solution of leuco indigo sodium salt prepared by reduction of 40 g of indigo by means of sodium dithionite ($Na_2S_2O_4$) in a conventional manner using again 600 parts of toluene in a stirred 2 l flask.

The dye obtained has a purity of >99.5% (measured photometrically) and is free of aromatic amines and other unwelcome impurities.

We claim:

1. A process for purifying indigo, which comprises extracting an aqueous leuco indigo alkali metal salt solution with an inert solvent under oxygen-excluding conditions and conventionally regenerating the indigo by oxidation.

2. A process as claimed in claim 1, wherein the extraction of the leuco indigo alkali metal salt solution is carried out at from 25° to 100° C.

3. A process as claimed in claim 1, wherein the extraction is carried out with a weight ratio of leuco indigo alkali metal salt solution:solvent of from 1:0.1 to 1:10.

4. A process as claimed in claim 1, wherein the solvent used is toluene.

5. A process as claimed in claim 2, wherein the temperature of extraction ranges from 40° to 70° C.

6. A process as claimed in claim 3, wherein said weight ratio of salt solution to solvent ranges from 1:0.5 to 1:5.

* * * * *